(12) United States Patent
Wilenski et al.

(10) Patent No.: US 7,842,209 B2
(45) Date of Patent: Nov. 30, 2010

(54) VACUUM DEBULK AND RADIATION CURE METHOD

(75) Inventors: Mark S. Wilenski, Seattle, WA (US); Arvid J. Berg, Seattle, WA (US)

(73) Assignee: The Boeing Company, Chicago, IL (US)

( * ) Notice: Subject to any disclaimer, the term of this patent is extended or adjusted under 35 U.S.C. 154(b) by 801 days.

(21) Appl. No.: 11/357,017

(22) Filed: Feb. 21, 2006

(65) Prior Publication Data

US 2007/0194475 A1 Aug. 23, 2007

(51) Int. Cl.
*B29C 47/76* (2006.01)

(52) U.S. Cl. ............ 264/102; 264/510; 264/511; 264/40.6; 264/494; 264/485; 264/488; 425/73; 425/174.4

(58) Field of Classification Search .......... 264/510, 264/511, 40.6, 494, 485, 488, 102; 425/73, 425/174.4
See application file for complete search history.

(56) References Cited

U.S. PATENT DOCUMENTS

| | | | |
|---|---|---|---|
| 4,357,193 A | 11/1982 | McGann et al. | |
| 4,915,896 A * | 4/1990 | Rachal et al. | 264/511 |
| 4,963,215 A | 10/1990 | Ayers | |
| 5,116,216 A * | 5/1992 | Cochran et al. | 425/504 |
| 5,236,646 A | 8/1993 | Cochran et al. | |
| 5,837,185 A | 11/1998 | Livesay et al. | |
| 6,017,484 A | 1/2000 | Hale | |
| 6,231,796 B1 * | 5/2001 | Allen | 264/72 |
| 6,761,783 B2 | 7/2004 | Keller et al. | |
| 2002/0022422 A1 | 2/2002 | Waldrop, III et al. | |
| 2003/0218267 A1 * | 11/2003 | Husmann et al. | 264/101 |
| 2004/0041128 A1 * | 3/2004 | Carter et al. | 252/500 |
| 2005/0253309 A1 * | 11/2005 | Hou et al. | 264/571 |

OTHER PUBLICATIONS

U.S. Appl. No. 11/154,522, filed Jun. 17, 2005, Westre et al.
Christopher J. Janke et al., "Critical Parameters for Electron Beam Curing of Cationic Epoxies and Property Comparison of Electron Beam Cured Cationic Epoxies Versus Thermal Cured Resins and Composites", 10 pages, May 4-8, 1997.
Captain Jeffrey D. Farmer et al., "The Electron Beam Cure of Fiberglass/Epoxy Prepregs", 18 pages, 1997.
B.J. Frame et al., "Results of Electron Beam Prepreg Debulking Study", Oak Ridge National Laboratory, SAMPE Conference, May 2002, 13 pages.
"UTL™ Compaction of Composites", www.fostermiller.com, printed Oct. 18, 2005, 1 page.
Paul Nahass, "Ultrasonic Compaction of Composites Enables New Applications, Reduced Cost, and Improved Quality", Foster-Miller, Inc., 6 pages.

(Continued)

*Primary Examiner*—Khanh Nguyen
*Assistant Examiner*—Saeed M Huda (57) ABSTRACT

To fabricate a composite item from a layup of composite material, the layup is degassed, debulked, and cured. To degas the layup, an envelope pressure within an envelope that includes the layup is reduced, a chamber pressure within a chamber that includes the envelope is reduced, and the layup is heated. To debulk the layup, the chamber pressure is increased relative to the envelope pressure so that the envelope exerts a compressive force upon the layup in response to the relatively higher chamber pressure as compared to the envelope pressure. To cure the layup, the layup is exposed to radiation.

16 Claims, 4 Drawing Sheets

OTHER PUBLICATIONS

Robert Biggs et al., "Advanced Composite Manufacturing Methods", SAE Technical Paper Series 2001-01-2601, SAE Aerospace Manufacturing Technology Conference, 2001 Aerospace Congress, Sep. 10-14, 2001, 10 pages.

Daniel L. Goodman et al., "Curing and Bonding of Composites Using Electron Beam Processing", Preprint of a chapter to be published in the Handbook of Polymer Blends and Composites, 42 pages, Rapra Technology Ltd., Shropshire, UK, 2001.

* cited by examiner

VACUUM DEBULK AND RADIATION CURE METHOD

FIELD OF THE INVENTION

The present invention generally relates to a resin debulking and radiation curing device and method. More particularly, the present invention pertains to a vacuum assisted resin debulking and radiation curing device and method.

BACKGROUND OF THE INVENTION

Laminated materials such as, for example, composites are widely utilized to increase structural rigidity in a wide variety of products. For example, composites are increasingly utilized by the airplane construction industry to build airframes, structural members of airframes, wings, wing spars, and the like. In some of the most advanced aircraft, where high strength and rigidity and low weight are extremely important, composites may account for a significant portion of the airframe as well as the external surface or skin. Typically, these composites are constructed from a plurality of layers placed over a form. These layers are often referred to as partial or full plies. Each ply may be in the form of unidirectional fiber material, woven fibers in a fabric, braided, metal foils, or a variety of other conformations. In general, the unidirectional material, such as, "tape" may be place in any arbitrary orientation or angle. Plies of tape are often placed in several directions or strand orientations such as, 0°, 90°, ±45°, and the like. The fibers may be made from any of a multitude of natural and/or "man-made" materials such as fiberglass, graphite, Kevlar®, and the like.

To fabricate a composite item, a "layup" of plies is placed in or on a form or mandrel. These plies may be saturated or pre-impregnated with a resin such as epoxy. This epoxy may be cured or hardened in a variety of ways depending upon the particular epoxy system utilized. If any internal voids are present in the layup, these voids may adversely affect the cured composite item. To minimize any voids present, the plies of the layup are typically place upon the mandrel with a roller that exerts a great deal of compaction force. Even with this compaction, some voids may remain. In addition, some resin systems may generate gasses as they are heated and/or during curing. While conventional methods and devices have been employed to overcome these issues, these conventional solutions have not been fully successful.

Accordingly, it is desirable to provide a system, apparatus and method for debulking a composite layup that is capable of overcoming the disadvantages described herein at least to some extent.

SUMMARY OF THE INVENTION

The foregoing needs are met, to a great extent, by the present invention, wherein in one respect a system, apparatus and method is provided that in some embodiments facilitates debulking a layup and radiation curing this layup.

An embodiment of the present invention relates to a method of fabricating a composite item from a layup of composite material. In this method, the layup is degassed, debulked, and cured. To degas the layup, an envelope pressure within an envelope that includes the layup is reduced, a chamber pressure within a chamber that includes the envelope is reduced, and the layup is heated. To debulk the layup, the chamber pressure is increased relative to the envelope pressure so that the envelope exerts a compressive force upon the layup in response to the relatively higher chamber pressure as compared to the envelope pressure. To cure the layup, the layup is exposed to radiation.

Another embodiment of the present invention pertains to an apparatus for fabricating a composite item from a layup of composite material. The apparatus includes a means for degassing the layup, means for reducing a chamber pressure, and means for curing the layup. The means for degassing the layup includes a means for reducing an envelope pressure within an envelope that includes the layup, a means for reducing a chamber pressure within a chamber that includes the envelope, and a means for heating the layup. The means for debulking the layup includes a means for increasing the chamber pressure relative to the envelope pressure so that the envelope exerts a compressive force upon the layup in response to the relatively higher chamber pressure as compared to the envelope pressure. The means for curing the layup to generate the composite item exposes the layup to radiation.

Yet another embodiment of the present invention relates to a system for fabricating a composite item. The system includes a debulking device, a vacuum source, and a radiation curing device. The debulking device includes a chamber, envelope, and heater. A chamber pressure is reduced in response to drawing air out of the chamber. An envelope is disposed within the chamber and the envelope is configured to receive the layup. An envelope pressure is reduced by drawing air from the envelope. The heater heats the layup in response to the layup being below a predetermined minimum temperature. The layup is degassed in response to heating the layup and reducing the chamber and envelope pressure. The layup is debulked by increasing the chamber pressure relative to the envelope pressure. The vacuum source is in fluid connection with the debulking device. The radiation curing device cures the layup.

Yet another embodiment of the present invention pertains to a device to debulk a layup of composite material. The composite material includes a radiation curable resin. The device includes a chamber, envelope, and heater. A chamber pressure is reduced in response to drawing air out of the chamber. An envelope is disposed within the chamber and the envelope is configured to receive the layup. An envelope pressure is reduced by drawing air from the envelope. The heater heats the layup in response to the layup being below a predetermined minimum temperature. The layup is degassed in response to heating the layup and reducing the chamber and envelope pressure. The layup is debulked by increasing the chamber pressure relative to the envelope pressure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

The present invention provides a vacuum debulking system, device, and method for use with radiation curable resin systems. In some embodiments, the vacuum debulking system facilitates degassing and debulking a composite layup that demonstrates a marked improvement over conventional systems for use with radiation curable resin systems. The layup includes at least one ply of composite material with a radiation curable resin. The vacuum debulking system includes a gas tight or substantially gas impermeable membrane that covers or envelopes the layup. In response to a pressure differential across the membrane, compressive force is exerted upon the layup. This process is typically referred to as "vacuum bagging" even though a "bag" or envelope may or may not be utilized. The vacuum debulking system further includes a vacuum chamber. By placing the vacuum bagged layup in the vacuum chamber and drawing a vacuum in both the vacuum bagged layup and the vacuum chamber, atmospheric pressure on the layup may be reduced. Reducing the atmospheric pressure facilitates degassing the resin. This degassing process may be further enhanced by reducing the viscosity of the resin. Depending upon the resin system utilized, the resin viscosity may be reduced by heating, for example.

Following degassing, the atmosphere within the vacuum chamber is increased or allowed to come to ambient pressure while the vacuum within the envelope is maintained. In this manner, the layup may be compressed or debulked via the action of the atmospheric pressure acting upon the envelope. This method reduces or eliminates any bubbles or voids within the layup utilizing any suitable resin system. Suitable resin systems include radiation curable thermoset resins, and the like. It is a particular advantage of embodiments of the invention that resins cured via electron beam ("EB") processing may be utilized. These EB cured resins exhibit material properties and processing characteristics that may be advantageous in relatively high technology applications such as, for example, aerospace, racing, sports equipment, and the like. Some particular advantages of radiation curable resins include: Low residual stresses compared to thermally cured composites; Ability to co-cure metallic components with composite material due to the low residual stresses; Ability to fabricate truly asymmetric structures without part warpage during cure; Lower cost tooling due to lower cure temperatures and pressures; Lower cost tool design because there does not need to be compensation for cure-induced dimensional variation; Does not require autoclaves; Radiation curable resins and adhesives have very long working and shelf lives at room temperature (measured in years, not days); Radiation curable resins and adhesives do not require freezers for storage; and The long working life allows the fabrication of very large and/or complex structures.

Fabricating EB cured composites is typically achieved without the use of an autoclave to achieve their greatest benefit. However, conventional methods for degassing and debulking the layups are difficult and time consuming. In addition, these conventional methods produce parts with only moderate quality and limited robustness. As such, the structural properties of conventionally fabricated composite items are unsatisfactory when made with EB cured resins.

Advantages of various embodiments of the invention include: (1) facilitates out gassing of resins; and (2) decreasing occurrences of air pockets within the reinforcement and/or between the reinforcement and mandrel.

Figure 1:
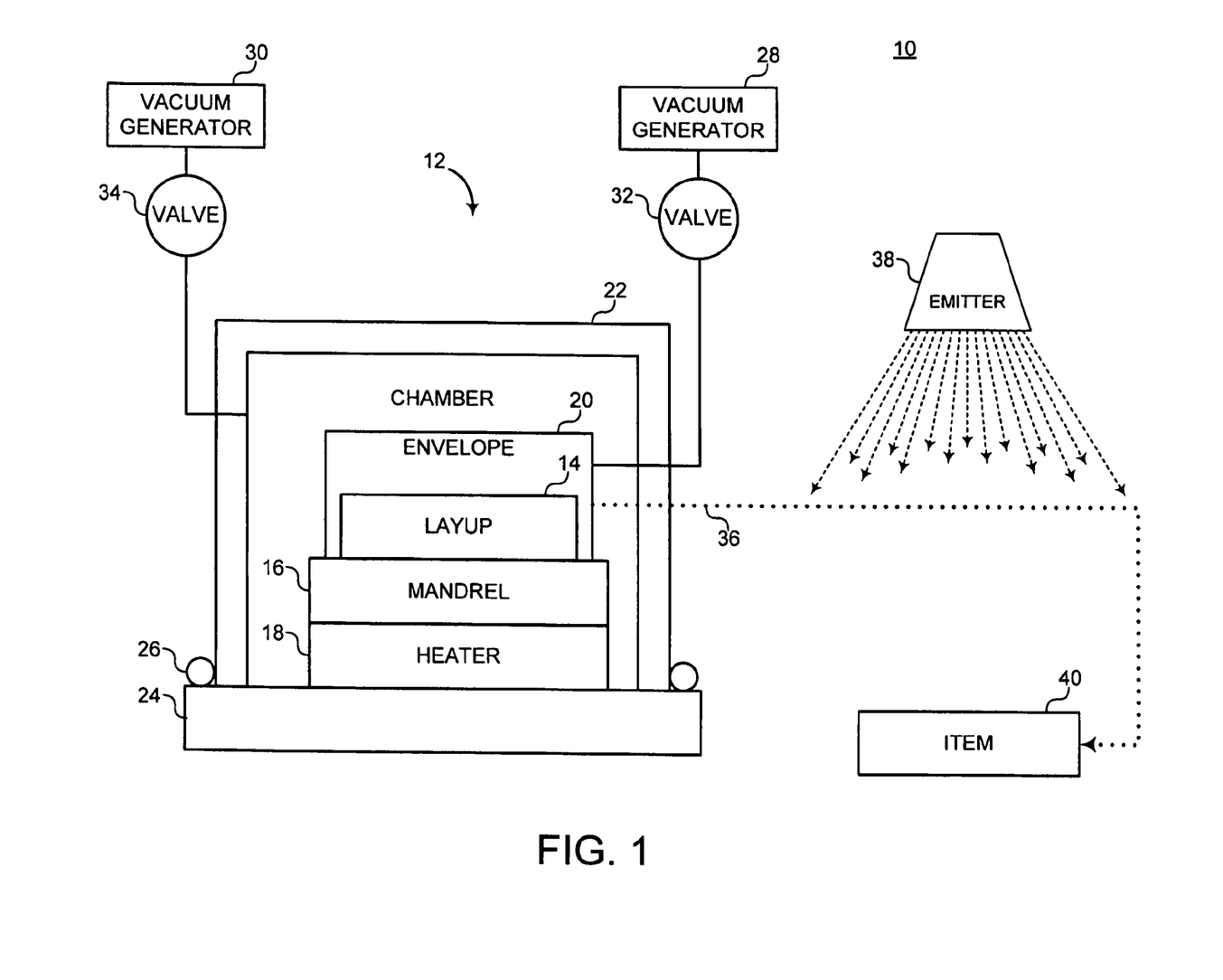
FIG. 1 is a block diagram of a vacuum debulking system according to an embodiment of the invention.

The invention will now be described with reference to the drawing figures, in which like reference numerals refer to like parts throughout. As shown in FIG. 1, a vacuum debulking system 10 includes a vacuum debulking device 12 to degas and compress a layup 14. The vacuum debulking device 12 includes a mandrel 16, heater 18, envelope 20, and vacuum chamber 22. The mandrel 16 includes a surface upon which the layup 14 is placed and provides a mold to which the layup 14 may conform to.

In operation, the layup 14 and envelope 20 may be disposed within the vacuum chamber 22. For example, the vacuum chamber 22 may be placed upon and sealed to the mandrel 16. In another embodiment, the vacuum chamber 22 is disposed upon a surface 24 and sealed with a sealant 26.

To debulk the layup 14, the layup 14 is compressed upon the mandrel 16 in response to a pressure differential across the envelope 20. This pressure differential is generated when an interior of the envelope 20 is at a relatively lower pressure than an exterior of the envelope 20. For example, a vacuum generator 28 in fluid connection with the envelope 20 may be configured to remove a portion of air and/or gasses from the envelope 20. If a pressure ("$P_{chamber}$") within the vacuum chamber 22 is greater than a pressure ("$P_{envelope}$") within the envelope 20, the envelope 20 may exert a compressive force ("$F_c$") upon the layup 14 that varies according to the difference between the $P_{envelope}$ and the $P_{chamber}$.

The vacuum chamber 22 facilitates controlling the $F_c$. In general, the vacuum chamber 22 is disposed to cover at least that portion of the envelope 20 that covers the layup 14. In a particular example, the vacuum chamber 22 is disposed to cover the layup 14, mandrel 16, heater 18, and envelope 20. The vacuum chamber 22 is in fluid communication with a vacuum generator 30 that may be controlled to remove a portion of the atmosphere outside of the envelope 20. By maintaining the $P_{chamber}$ at or below the $P_{envelope}$, the $F_c$ may be reduced or eliminated. In this manner, the layup 14 may be degassed. In this regard, the heater 18 is configured to impart thermal energy upon the layup 14 and thereby facilitate the egress of any gas from the layup 14. The heater 18 may include any suitable heating device such as, for example, a heating element, infra red (IR) heater, oven, and the like.

The vacuum debulking device 12 optionally includes one or more valve such as valves 32 and 34. If present, the valves 32 and 34 are configured to control the amount of vacuum pressure within the envelope 20 and vacuum chamber 22.

According to various embodiments, the layup 14 includes a radiation curable resin and/or a thermoset type resin. Generally, the viscosity of these resin systems is reduced, initially, by an increase in temperature. Radiation curable resins are, as the name implies, "cured" by exposure to radiation such as, for example, electron beam ("EB"), X-ray, ultraviolet, and the like. The curing process solidifies the resin via an essentially irreversible chemical polymerization reaction. In this regard, the layup 14 may be cured 36 via exposure to an emitter 38.

As a result of the debulking and any curing procedures, a composite item 40 is generated. The composite item 40 includes any suitable item or part such as, for example, "C-channels" and other structural members, wing spars, fuselage frames, panels, and the like.

Figure 2:
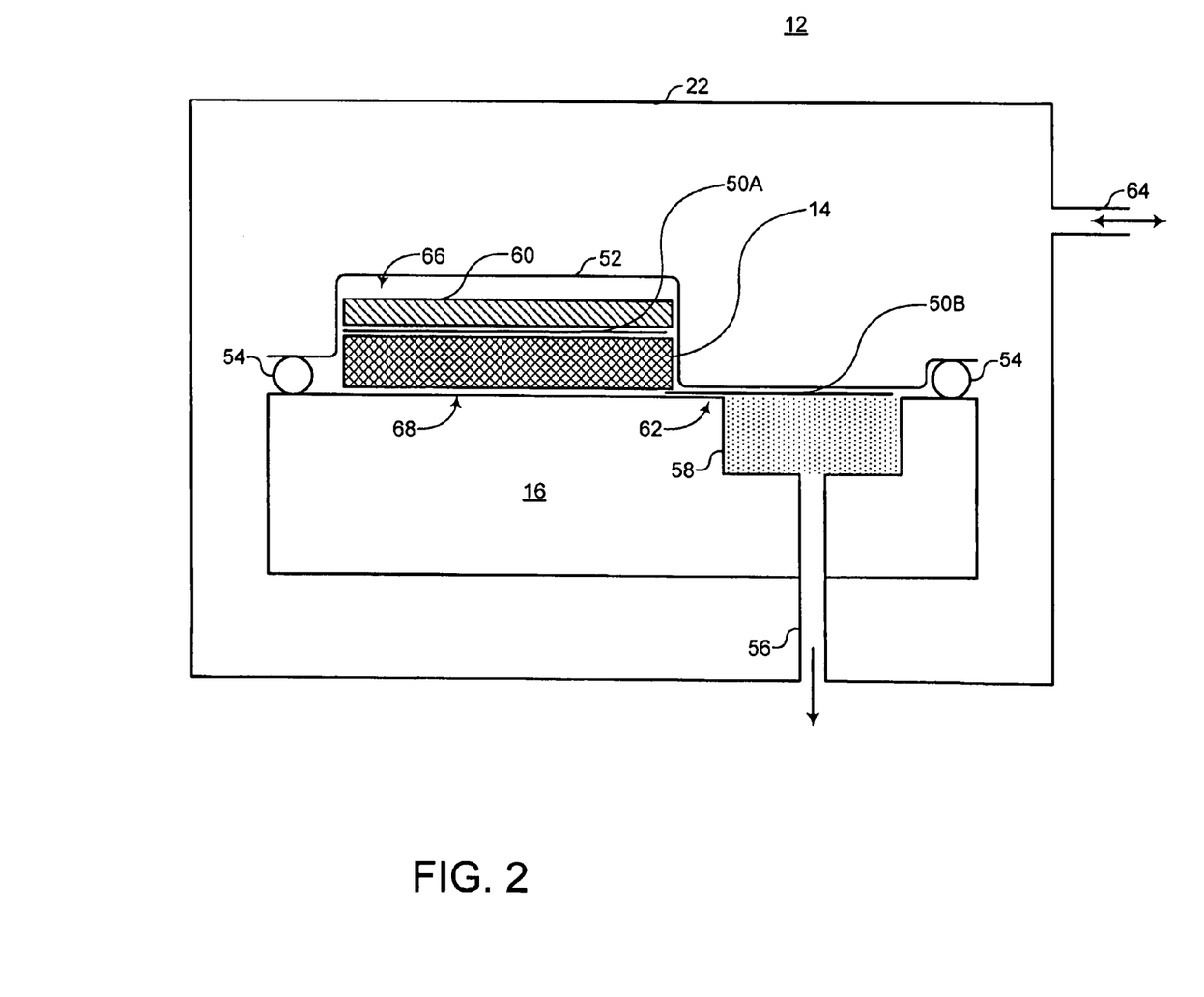
FIG. 2 is a cross-sectional view of a vacuum debulking device suitable for use with the vacuum debulking system according to FIG. 1.

FIG. 2 is a cross-sectional, view of the vacuum debulking device 12 suitable for use with the vacuum debulking system 10. As shown in FIG. 2, the vacuum debulking device 12 includes the layup 14 and the mandrel 16. In addition, the vacuum debulking device 12 includes parting films 50A and 50B, bagging film 52, sealant 54, vacuum port 56, exit breather 58, and an optional caul plate 60.

The parting films 50A and 50B include any suitable release film or peel ply operable to reduce adhesion of the cured item 40 to the various other components of the vacuum debulking device 12. Generally, suitable parting films include those that do not appreciably adhere to the layup 14. Suitable parting films may facilitate a flow of air there through so as to facilitate the degassing and debulking processes. In a particular example, the parting films 50A and 50B are Teflon® coated woven fiberglass layers such as Armalon®. As shown in FIG. 2, the parting film 50A is disposed to cover at least a portion of the layup 14. Also shown in FIG. 2, the parting film 50B is disposed to cover at least some portion of the exit breather 58 and may extend under the layup 14.

The caul plate 60 is optionally included to facilitate modification of surface characteristics. If present, the caul plate 60 may include a relatively stiff or rigid material having a lower surface that is drawn toward an upper surface of the reinforcement. In this manner, the upper surface of the reinforcement may be modified to essentially correspond to the lower surface of the caul plate 60.

The bagging film 52 is a gas tight or essentially gas impermeable membrane to facilitate generating a pressure differential. That is, when sealed upon the mandrel 16, the bagging film 52 forms the envelope 20 (See FIG. 1) enclosing the layup 14 and, to a sufficiently large extent, prevents air and/or gasses from passing there through. Generally, the bagging film 52 includes any suitably impermeable membrane, layer, or barrier. Suitable materials from which the bagging film may be made include plastics, rubbers, resins, metals, and the like. Air and/or other gasses drawn from the envelope 20 generates a pressure differential that exerts a compressive force upon the contents of the envelope 20.

The sealant 54 facilitates generating a gas tight or substantially gas impermeable seal between the bagging film 52 and the mandrel 16. In various embodiments, the sealant 54 includes any suitable sealing material and/or method. Examples of suitable sealing materials and/or methods includes sticky, tacky and other such adhesive tapes or cordage, heat sealing, elastomeric seals, and the like. In other embodiments, the sealant 54 is optional and may be omitted. For example, the vacuum film 46 may include a bag, reusable bag, or other such envelope that the layup 14 and/or mandrel 16 is placed in.

The vacuum port 56 facilitates removal of some or all of the atmosphere from the envelope 20. For example, the vacuum port 56 may be fluidly attached to the vacuum generator 28. In this manner, air and/or other gasses may be drawn out from within the envelope 20 by the vacuum generator 28.

The exit breather 58 facilitates removal of the atmosphere from the envelope 20 by increasing the surface area from which gasses are removed via the vacuum port 56. In a particular example, the exit breather 58 includes a porous fabric, woven fiberglass tape, metal or ceramic material.

To reduce any likelihood of resin being drawn into the exit breather 58, the vacuum debulking device 12 includes a choke zone 62 or other such region disposed between the layup 14 and the exit breather 58. The layup 14 is held back from the choke zone 62. To facilitate movement of air and/or gasses from the layup 14 to the exit breather 58, the parting film 50B is placed to extend across the choke zone 62 and cover most or all of the exit breather 58.

Also shown in FIG. 2, the vacuum chamber 22 includes a port 64 in fluid connection to the vacuum generator 30. By modulating the $P_{chamber}$ relative to the $P_{envelope}$, a force ($F_{bf}$) exerted by the bagging film 52 upon the layup 14 may be controlled. For example, by modulating the $P_{chamber}$ to essentially coincide with the $P_{envelope}$, the $F_{bf}$ may be substantially zero. In another example, by maintaining a negative pressure differential or negative Δ pressure of the $P_{chamber}$ relative to the $P_{envelope}$, the bagging film 52 may be drawn away from the layup 14 to generate an out gassing pocket 66. In this regard, the $P_{envelope}$ is essentially equal to a pressure within the out gassing pocket 66 ($P_{pocket}$). By modulating the $P_{chamber}$ relative to the $P_{envelope}$ (e.g., $P_{pocket}$) to generate a positive Δ pressure, the layup 14 may be compressed or debulked.

The out gassing pocket 66 provides a volume for any out gassed products and/or provides some "head space" for bubbles, which rise to the surface of the resin during out gassing, to break in.

The mandrel 16 may include a layup zone 68 to provide a surface, upon which, the layup 14 may be disposed. The layup zone 68 may be configured to correspond to a surface of the item 40. In addition, the layup zone 68 may be surfaced as appropriate. For example, a release coating may be applied to the layup zone 68 to facilitate removal of the item 40. In another example, the layup zone 68 may be polished or otherwise surfaced to facilitate layup and/or release of the item 40.

To prepare the vacuum debulking device 12 for operation, the various components of the vacuum debulking device 12 are positioned, one upon the other in a manner similar to that illustrated in FIG. 2. In operation, the vacuum debulking device 10 includes the gas tight envelope 20 (See FIG. 1) that surrounds the layup 14 and various layers. Gasses are drawn from the envelope 20 via the exit breather 58 and from the vacuum chamber 22 via the port 64. The layup 14 is heated via the heater 18 and any gasses present in the layup 14 may escape from the layup 14 to accumulate in the out gassing pocket 66 and/or may be drawn out of the envelope 20 via the exit breather 58. Upon sufficient out gassing, air may be allowed to enter the port 64 in response to modulation of the valve 34, for example. As air enters the vacuum chamber 22, the Δ pressure is increased, thereby increasing the $F_{bf}$ to debulk the layup 14.

Figure 3:
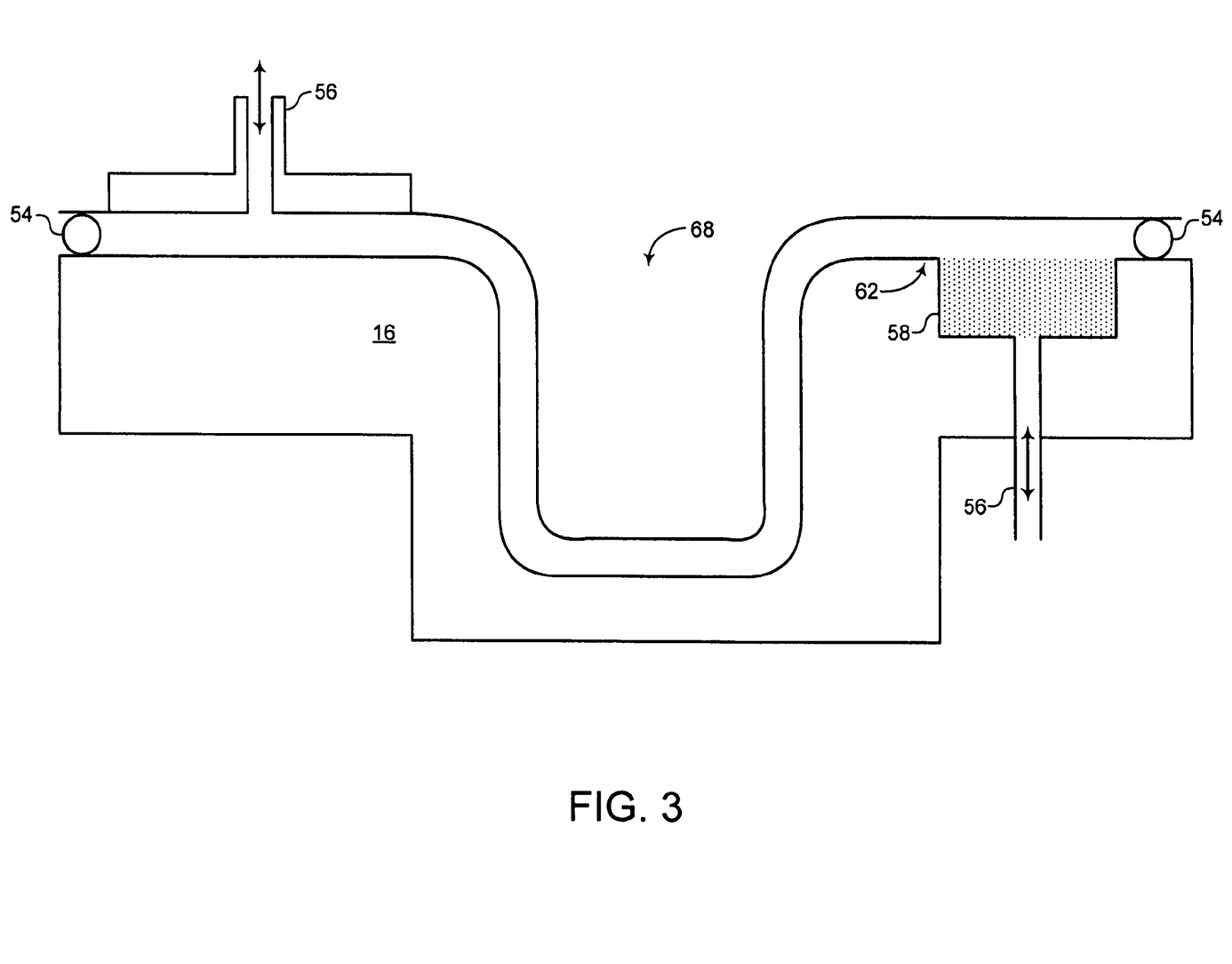
FIG. 3 is a cross-sectional view of a mandrel suitable for use with the vacuum debulking system according to FIG. 1.

FIG. 3 is a cross-sectional view of the mandrel 16 suitable for use with the vacuum debulking system 10 according to FIG. 1. The mandrel 16 of FIG. 3 is similar to the mandrel 16 of FIG. 2, and thus, in the interest of brevity, those items described in FIG. 2, will not be described again in FIG. 3. As shown in FIG. 3, the mandrel 16 includes the layup zone 68 that corresponds to the item 40. More particularly, the item 40 is a "C" channel and the layup zone 68 includes a female mold that corresponds to the "C" channel profile. In addition, the vacuum debulking device 12 includes an alternative vacuum port 56 in the bagging film 52. In operation, the bagging film vacuum port 56 or the mandrel vacuum port 56 may be utilized.

Figure 4:
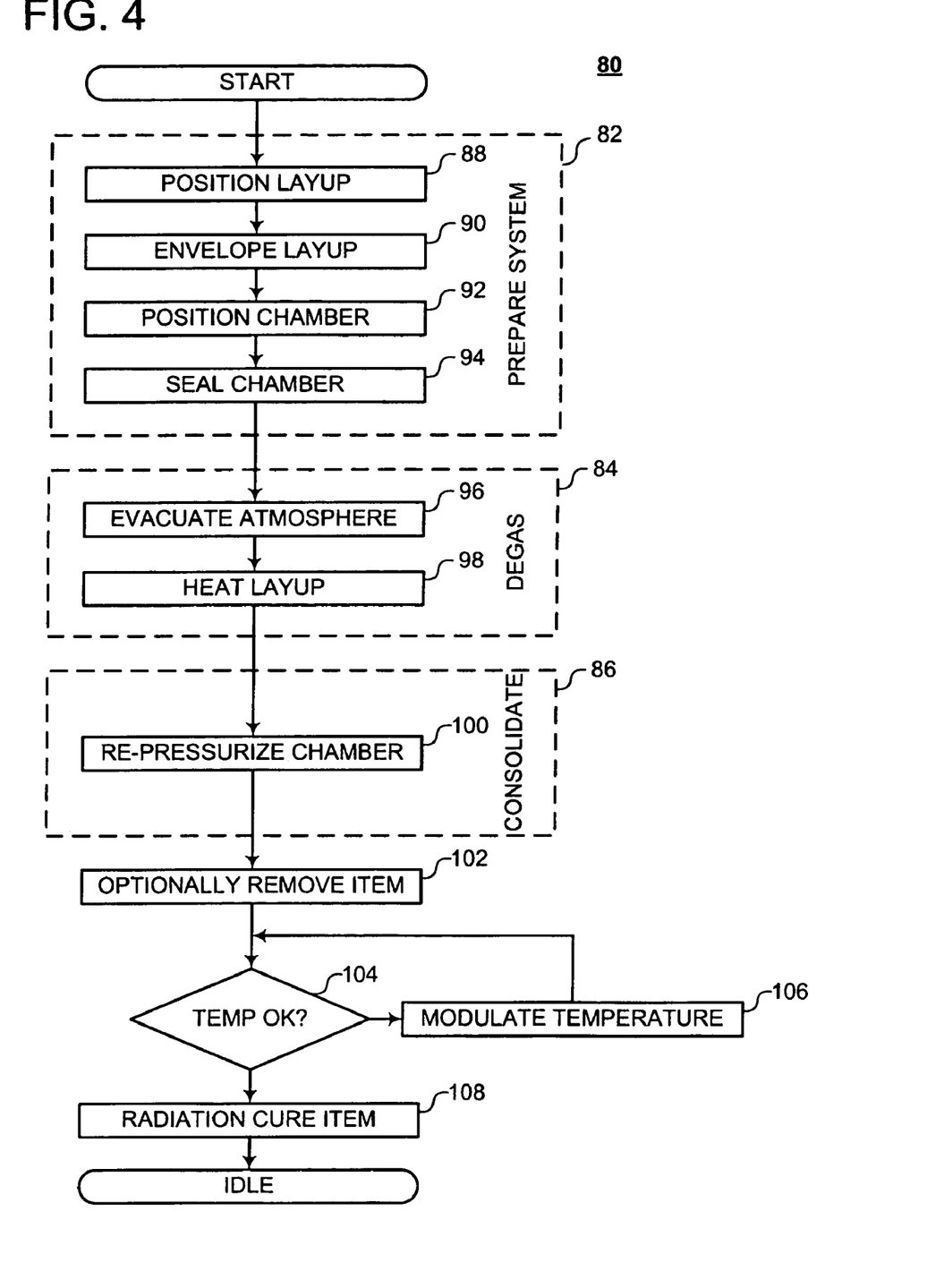
FIG. 4 is a flow diagram illustrating steps that may be followed in accordance with an embodiment of the method or process.

FIG. 4 illustrates steps involved in a method 80 of debulking the layup 14 to fabricate the item 40. Prior to the initiation of the method 80, the item 40 is designed and a series of computer readable instructions specifying attributes of the composite product is generated. These instructions are utilized to generate the mandrel 16. In addition, the various components of the vacuum debulking system 10 are gathered and prepared for the process. Furthermore, the mandrel 16 may be prepared for the debulking process by applying a release coating to any surfaces that may come into contact with the layup 14. In addition, vacuum lines may be attached to the vacuum port 56 and vacuum generator 28, and the like.

In general, at step 82, the vacuum debulking system 10 is first prepared. Then, at step 84, the layup 14 is degassed and, at step 86, the layup 14 is debulked. More particularly, at step 88, the layup is positioned. In general, positioning the layup includes positioning the plies of composite material that make up the layup 14 and the various other layers on or in the mandrel 16 as shown in FIGS. 2 and 3. The plies may include fabric, unidirectional, and/or non-woven fibrous material, metal foils, and the like. The material of the fibers may include glass, carbon, quartz, Kevlar®, polymers, aramid, and/or other such fibers. In addition, the plies may include strips that are, themselves, woven prior to or during placement on the mandrel 16. These plies may be pre-impregnated with any suitable resin. In addition, the parting films 50A and/or 50B are positioned. For example, the parting film 50A is disposed upon the layup 14 and the parting film 40 B is disposed upon at a least a portion of the exit breather 58. The parting film 50B may additionally be disposed upon some portion of the mandrel 16 intervening between the layup zone 68 and the exit breather 58.

Optionally, at step 88, the caul plate 60 is positioned. If utilized, the caul plate 60 is disposed relatively above the layup 14 and tends to reduce surface irregularities. In addition, the caul plate 60 may be utilized to impart a predetermined surface feature. In other instances, the caul plate 60 does not appreciably reduce surface irregularities, and thus, may be omitted.

At step 90, the layup 14 is sealed within the envelope 20. For example, the sealant 54 and the bagging film 52 are positioned. More particularly, a sticky, tacky, or adhesive ribbon or cord-like material may be disposed about a perimeter of the mandrel 16. Thereafter, the bagging film 52 may be disposed to extend to or beyond the sealant 54.

At step 92, the vacuum chamber 22 is positioned. For example, the vacuum chamber 22 may be positioned upon the surface 24 so as to cover the layup 14 and/or mandrel 16.

At step 94, the vacuum chamber 22 may be sealed. For example, a sticky, tacky, or adhesive ribbon or cord-like material or rubber gasket may be disposed about a perimeter of the vacuum chamber 22.

To degas the layup 14, the pressure is reduced and the viscosity of the resin is reduced. More particularly, at step 96, the vacuum generators 28 and/or 30 may withdraw a portion of the air and/or gas from the envelope 20 and/or the vacuum chamber 22. Optionally, the vacuum pressure may be modulated to generate a slight negative Δ pressure and thereby generate the out gassing pocket 66.

At step 98, the layup 14 may be heated. For example, the heater 18 may apply sufficient heat to the layup 14 to reduce the viscosity of the resin. The reduced $P_{envelope}$ and/or $P_{chamber}$ may be held for a period of time sufficient to degas the layup 14. For example, the vacuum chamber 22 may be transparent to facilitate viewing the layup 14. Upon cessation of bubbling activity, the out gassing procedure may be completed. In addition, a specific "recipe" of time, temperature, and pressures may be used. This "recipe" may be specific to the material and/or material/part combination.

Following degassing, the layup 14 may be debulked at step 100. According to an embodiment, the Δ pressure is modulated to debulk the layup 14. For example, the $P_{chamber}$ may be raised to generate a positive Δ pressure. In a particular example, the valve 34 may be modulated to stop or reduce the flow of air from the vacuum chamber 22 to the vacuum generator 30 and the valve 34 may be further modulated to allow a controlled amount of air into the vacuum chamber 22. By controlling the Δ pressure, the rate of debulking may be controlled.

At step 102, the debulked item 40 is optionally removed from the chamber 22. For example, the chamber 22 may be removed to facilitate curing the item 40. In another example, the vacuum debulking device 12 may be left intact and, at step 108, the item may be cured while in the chamber 22. In such instances, the chamber 22 may include a radiation transparent portion or window to facilitate exposing the item 40 to radiation or the emitter 38 may be disposed within the chamber 22.

At step 104, it is determined whether the temperature of the layup 14 is appropriate for the curing procedure. Depending upon the resin system and curing method, it may be optimal to cure the layup 14 at a temperature that is relatively higher or lower than the degassing temperature. Accordingly, at step 104, the temperature of the layup is sensed and it determined if the temperature is within a predetermined curing temperature range. For example, if it is determined that the temperature of the layup 14 is relatively greater than a predetermined maximum temperature, the layup 14 may be cooled or allowed to cool at step 106. If it is determined that the temperature of the layup 14 is relatively less than a predetermined minimum curing temperature, the layup 14 may be heated at step 106.

At step 106, the temperature of the layup 14 is modulated in response to the sensed temperature being outside the predetermined curing temperature range. More particularly, the layup 14 is cooled in response to the sensed temperature being relatively higher than the predetermined maximum curing temperature or the layup 14 is heated in response to the sensed temperature being relatively less than the predetermined minimum curing temperature. The predetermined maximum and minimum temperatures may be based upon a variety of factures such as, for example, resin manufacturers' recommendations, thickness of the layup 14, composition of the layup 14, empirical data, and the like.

At step 108, the layup 14 is cured to generate the item 40. Various resin formulations employ a variety of methods for chemical hardening or polymerization. For example, a group of resins broadly classified as radiation curable resins are cured by exposure to radiation such as EB, X-rays, ultra violet, and the like. To cure the layup 14, the layup 14 may be introduced to a beam of radiation via a conveyer belt, for example. In another example, the emitter 38 may be passed over and/or around the layup 14. In these or other such manners, sufficient radiation is applied the layup 14 in a controlled manner to facilitate a chemical reaction or polymerization of the resin in the layup 14.

Following the method 80, the item 40 may be removed from the vacuum debulking device 12 and parted from the layup. Optionally, the item 40 may be finished. Finishing may encompass sanding, polishing, milling, cleaning, or the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of fabricating a composite item from a layup of composite material, the method comprising the sequential steps of:
  degassing the layup, comprising:
    reducing an envelope pressure within an envelope, the layup being disposed in the envelope;
    reducing a chamber pressure within a chamber such that the envelope pressure is higher than the chamber pressure, the envelope being disposed in the chamber; and
    heating the layup to a degassing temperature;
  debulking the layup, comprising:
    increasing the chamber pressure such that the envelope pressure is lower than the chamber pressure, the envelope exerting a compressive force upon the layup; and
  curing the layup at a temperature that is lower than the degassing temperature to generate the composite item, the layup being cured by exposure to radiation.

2. The method according to claim 1, further comprising:
  modulating a temperature of the layup in response to the temperature being outside a predetermined curing temperature range.

3. The method according to claim 2, further comprising:
  sensing the temperature of the layup; and
  cooling the layup in response to the sensed temperature being greater than a predetermined maximum curing temperature.

4. The method according to claim 1, wherein the degassing step further comprises:
  generating an out gassing pocket by reducing the chamber pressure relative to the envelope pressure.

5. The method according to claim 1, wherein curing further comprises:
  exposing the layup to electron beam radiation.

6. The method according to claim 1, wherein curing further comprises:
  exposing the layup to ultraviolet radiation.

7. The method according to claim 1, wherein curing further comprises:
  exposing the layup to X-ray radiation.

8. The method according to claim 3, wherein the step of cooling the layup is performed after debulking and prior to curing the layup.

9. The method according to claim 2, further comprising:
  sensing the temperature of the layup; and
  heating the layup in response to the sensed temperature being less than a predetermined maximum curing temperature.

10. The method according to claim 9, wherein the step of heating the layup is performed after debulking and prior to curing the layup.

11. The method according to claim 1, wherein the step of curing the layup is performed while the layup is in the chamber.

12. The method according to claim 1, wherein the step of curing the layup is performed after removing the layup from the chamber.

13. The method according to claim 1, wherein the step of reducing a chamber pressure within the chamber such that the envelope pressure is higher than the chamber pressure comprises drawing a vacuum on the envelope.

14. The method according to claim 1, wherein the step of reducing the chamber pressure comprises drawing a vacuum on the chamber.

15. The method according to claim 1, wherein the step of increasing the chamber pressure relative to the envelope pressure comprises the step of:
  allowing the chamber pressure to come to ambient while maintaining the vacuum within the envelope.

16. The method according to claim 4, wherein the degassing step further comprises:
  drawing gasses out of the out gassing pocket.

* * * * *